US012639845B2

(12) United States Patent (10) Patent No.: US 12,639,845 B2
Okubo (45) Date of Patent: May 26, 2026

(54) APPARATUS AND METHOD FOR DISTANCE ESTIMATION

(71) Applicant: TOYOTA JIDOSHA KABUSHIKI KAISHA, Toyota (JP)

(72) Inventor: Tadashi Okubo, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 337 days.

(21) Appl. No.: 18/209,271

(22) Filed: Jun. 13, 2023

(65) Prior Publication Data

US 2024/0070909 A1 Feb. 29, 2024

(30) Foreign Application Priority Data

Aug. 25, 2022 (JP) ................................. 2022-134393

(51) Int. Cl.
*G06T 3/4007* (2024.01)
*G06T 7/73* (2017.01)

(52) U.S. Cl.
CPC .............. *G06T 7/74* (2017.01); *G06T 3/4007* (2013.01); *G06T 2207/30252* (2013.01)

(58) Field of Classification Search
CPC .................... G06T 7/74; G06T 3/4007; G06T 2207/30252; G06T 2207/30244; G06T 7/579; G06V 20/58; G06V 10/462; G06V 10/82
See application file for complete search history.

(56) References Cited

U.S. PATENT DOCUMENTS

| | | | |
|---|---|---|---|
| 6,847,392 B1 | 1/2005 | House | |
| 2012/0314073 A1 | 12/2012 | Shimoda et al. | |
| 2012/0327189 A1 | 12/2012 | Muramatsu et al. | |
| 2016/0232413 A1* | 8/2016 | Ito | G06V 20/588 |
| 2016/0364619 A1* | 12/2016 | Ogata | G06T 7/50 |
| 2018/0032080 A1* | 2/2018 | Oska | G06V 20/58 |
| 2018/0261094 A1* | 9/2018 | Nishimura | G08G 1/16 |
| 2024/0310851 A1* | 9/2024 | Ebrahimi Afrouzi | G01S 17/87 |

FOREIGN PATENT DOCUMENTS

| | | | | |
|---|---|---|---|---|
| JP | H10-134187 A | 5/1998 | | |
| JP | 2003-247824 A | 9/2003 | | |
| JP | 2011-191905 A | 9/2011 | | |
| JP | 2013-001155 A | 1/2013 | | |
| JP | 2013-054399 A | 3/2013 | | |
| JP | 2015-232442 A | 12/2015 | | |
| WO | WO-2022038260 A1 * | 2/2022 | ........... | G06F 18/214 |

* cited by examiner

*Primary Examiner* — Jonathan S Lee
*Assistant Examiner* — D J Dhooge
(74) *Attorney, Agent, or Firm* — Oliff PLC

(57) ABSTRACT

An apparatus for distance estimation identifies a first partial region from a first surrounding image generated at a first point of time by a first camera, generates an interpolated second surrounding image corresponding to the first point of time by using a preceding second surrounding image and the succeeding second surrounding image, and estimates an interpolated position of the second camera corresponding to the first point of time. The apparatus detects one or more feature points for a target object represented in both the first partial region and the interpolated second surrounding image, and estimates the distance between the vehicle and the target object.

4 Claims, 5 Drawing Sheets

FIG. 5

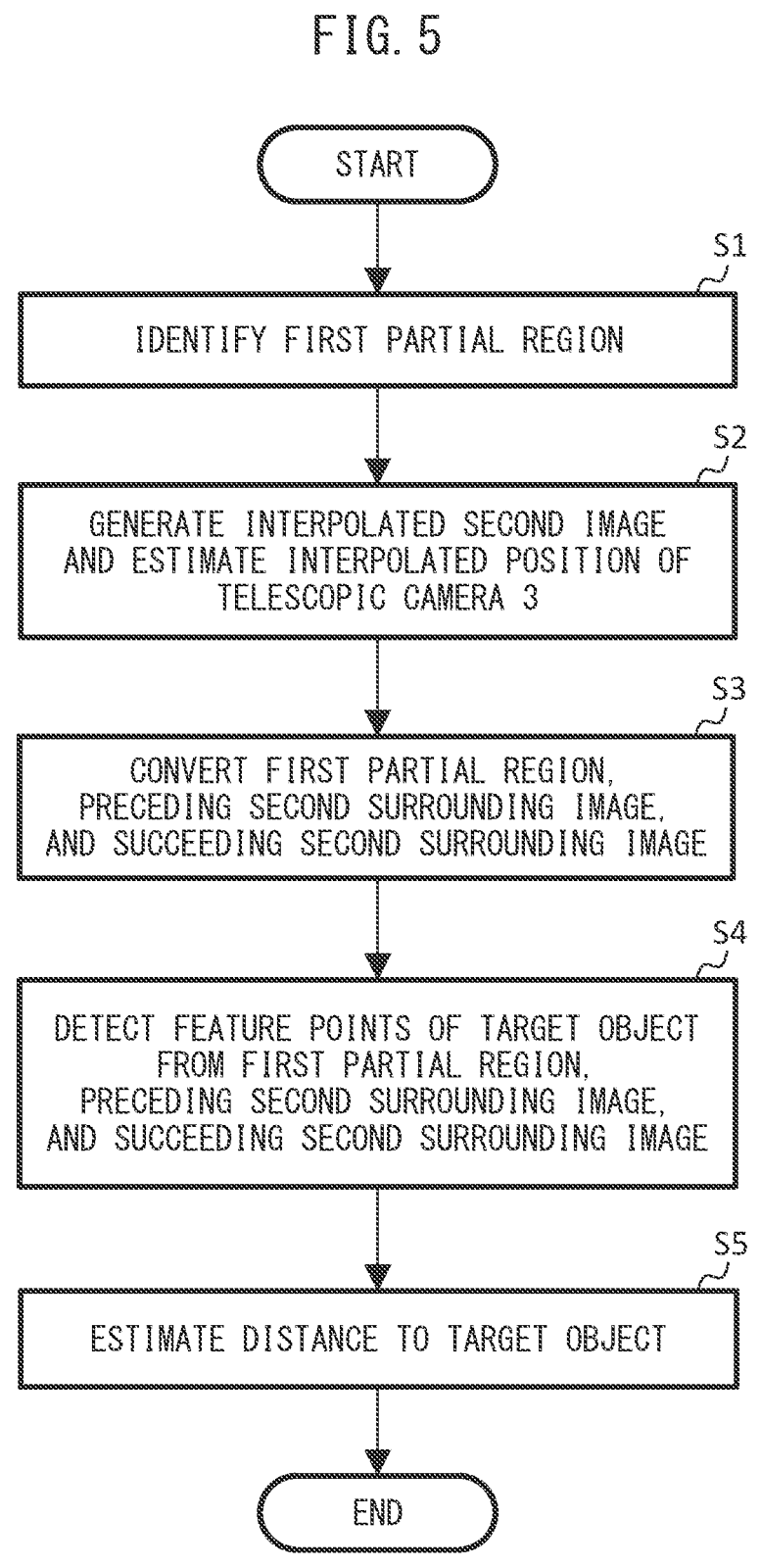

START

↓

S1

IDENTIFY FIRST PARTIAL REGION

↓

S2

GENERATE INTERPOLATED SECOND IMAGE
AND ESTIMATE INTERPOLATED POSITION OF
TELESCOPIC CAMERA 3

↓

S3

CONVERT FIRST PARTIAL REGION,
PRECEDING SECOND SURROUNDING IMAGE,
AND SUCCEEDING SECOND SURROUNDING IMAGE

↓

S4

DETECT FEATURE POINTS OF TARGET OBJECT
FROM FIRST PARTIAL REGION,
PRECEDING SECOND SURROUNDING IMAGE,
AND SUCCEEDING SECOND SURROUNDING IMAGE

↓

S5

ESTIMATE DISTANCE TO TARGET OBJECT

↓

END

APPARATUS AND METHOD FOR DISTANCE ESTIMATION

FIELD

The present disclosure relates to an apparatus and method for distance estimation of a distance from a vehicle to a surrounding object.

BACKGROUND

An appropriate estimation of the distance from a vehicle to a surrounding object is important for suitable operation assistance of the vehicle. Japanese Unexamined Patent Publication No. 2013-54399 (hereinafter "PTL 1") describes a device for monitoring the surroundings of a vehicle estimating a distance from the vehicle to an object within a predetermined distance and tracking a position of the object.

SUMMARY

The device described in PTL 1 estimates a distance from the vehicle to an object based on a parallax of respective regions corresponding to the same object in the images generated by two cameras (stereo cameras) arranged in the vehicle aligned so that their optical axes become parallel. Since the device of PTL 1 requires dedicated stereo cameras for estimating the distance from the vehicle to an object, it therefore involves higher cost. As a result, there is demand for an apparatus for distance estimation which does not require dedicated hardware such as stereo cameras.

It is an object of the present disclosure to provide an apparatus for distance estimation that estimates a distance to a target object in the surroundings of a vehicle without relying on dedicated stereo cameras.

An apparatus for distance estimation device according to the present disclosure includes a processor configured to identify, from a first surrounding image representing surroundings of a vehicle generated at a first point of time by a first camera mounted in the vehicle and having a first imaging range, a first partial region corresponding to a region represented in a preceding second surrounding image generated at a second point of time before the first point of time by a second camera mounted in the vehicle and having a second imaging range narrower than the first imaging range or a region represented in a succeeding second surrounding image generated at a third point of time after the first point of time by the second camera. The processor of the apparatus is further configured to generate an interpolated second surrounding image corresponding to the first point of time by using the preceding second surrounding image and the succeeding second surrounding image and estimate an interpolated position of the second camera corresponding to the first point of time by using the respective positions of the second camera at the second point of time and the third point of time or the position of the first camera at the first point of time. The processor of the apparatus is further configured to detect one or more feature points for a target object represented in both the first partial region and the interpolated second surrounding image. The processor of the apparatus is further configured to estimate the distance between the vehicle and the target object by using at least a relationship between the position of the first camera at the first point of time and the interpolated position of the second camera, and, a relationship between the position of one feature point among the one or more feature points in the first partial region and the position of the feature point corresponding to the one feature point in the interpolated second surrounding image.

The processor of the apparatus according to the present disclosure preferably further configured to convert the first partial region and the interpolated second surrounding image so as to have the same resolutions by changing a resolution of at least one of the first partial region and interpolated second surrounding image.

A method for distance estimation according to the present disclosure includes identifying from a first surrounding image representing surroundings of a vehicle generated at a first point of time by a first camera mounted in the vehicle and having a first imaging range, a first partial region corresponding to a region represented in a preceding second surrounding image generated at a second point of time before the first point of time by a second camera mounted in the vehicle and having a second imaging range narrower than the first imaging range or a region represented in a succeeding second surrounding image generated at a third point of time after the first point of time by the second camera, generating an interpolated second surrounding image corresponding to the first point of time by using the preceding second surrounding image and the succeeding second surrounding image and estimating an interpolated position of the second camera corresponding to the first point of time by using the respective positions of the second camera at the second point of time and the third point of time or the position of the first camera at the first point of time, detecting one or more feature points for a target object represented in both the first partial region and the interpolated second surrounding image, and estimating the distance between the vehicle and the target object by using at least a relationship between the position of the first camera at the first point of time and the interpolated position of the second camera and a relationship between the position of one feature point among the one or more feature points in the first partial region and the position of the feature point corresponding to the one feature point in the interpolated second surrounding image.

A computer program for distance estimation stored in a non-transitory computer-readable medium according to the present disclosure causes a computer to execute a process including identify from a first surrounding image representing surroundings of a vehicle generated at a first point of time by a first camera mounted in the vehicle and having a first imaging range, a first partial region corresponding to a region represented in a preceding second surrounding image generated at a second point of time before the first point of time by a second camera mounted in the vehicle and having a second imaging range narrower than the first imaging range or a region represented in a succeeding second surrounding image generated at a third point of time after the first point of time by the second camera, generating an interpolated second surrounding image corresponding to the first point of time by using the preceding second surrounding image and the succeeding second surrounding image and estimating an interpolated position of the second camera corresponding to the first point of time by using the respective positions of the second camera at the second point of time and the third point of time or the position of the first camera at the first point of time, detecting one or more feature points for a target object represented in both the first partial region and the interpolated second surrounding image, and estimating the distance between the vehicle and the target object by using at least a relationship between the position of the first camera at the first point of time and the interpolated position of the second camera and a relationship between the position of one feature point among the one or more feature points in the first partial region and the position of the feature point corresponding to the one feature point in the interpolated second surrounding image.

The apparatus according to the present disclosure can estimate a distance to a target object in the surroundings of a vehicle without relying on dedicated stereo cameras.

BRIEF DESCRIPTION OF DRAWINGS

FIG. 5 is a flowchart of a process for estimating distance.

DESCRIPTION OF EMBODIMENTS

An apparatus for distance estimation that can estimate a distance to a target object in the surroundings of a vehicle without relying on dedicated stereo cameras will now be described in detail with reference to the attached drawings. The apparatus identifies a first partial region from a first surrounding image representing surroundings of a vehicle generated by a first camera mounted in the vehicle at a first point of time. The first partial region corresponds to a region represented in a preceding second surrounding image generated at a second point of time before the first point of time by a second camera mounted in the vehicle or a region represented in a succeeding second surrounding image generated at a third point of time after the first point of time by the second camera. The first camera has a first imaging range while the second camera has a second imaging range smaller than the first imaging range. Next, the apparatus generates an interpolated second surrounding image corresponding to the first point of time by using the preceding second surrounding image and the succeeding second surrounding image. Further, the apparatus estimates an interpolated position of the second camera corresponding to the first point of time by using the respective positions of the second camera at the second point of time and the third point of time or the position of the first camera at the first point of time. Next, the apparatus detects one or more feature points for a target object represented in both the first partial region and the interpolated second surrounding image. Further, the apparatus estimates the distance between the vehicle and the target object by using at least a relationship between the position of the first camera at the first point of time and the interpolated position of the second camera and a relationship between the position of one feature point among the one or more feature points in the first partial region and the position of the feature point corresponding to the one feature point in the interpolated second surrounding image.

Figure 1:
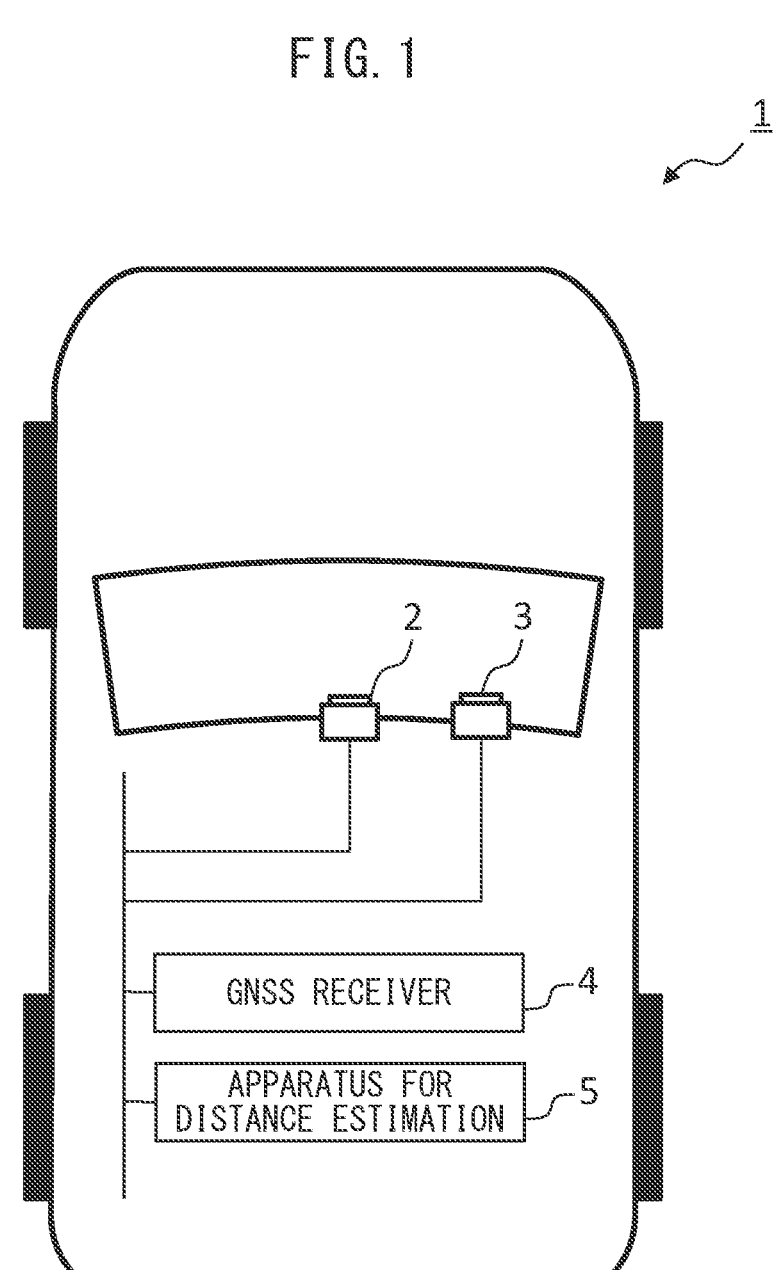
FIG. 1 schematically illustrates the configuration of a vehicle equipped with an apparatus for distance estimation.

FIG. 1 schematically illustrates the configuration of a vehicle equipped with an apparatus distance estimation.

The vehicle 1 has a wide-angle camera 2, a telescopic camera 3, a global navigation satellite system (GNSS) receiver 4, and a distance estimating device 5. The wide-angle camera 2, the telescopic camera 3, and the GNSS receiver 4 and the apparatus 5 for distance estimation are connected via an in-vehicle network conforming to a standard, such as a controller area network, so that they can communicate with each other.

The wide-angle camera 2 is an example of a first camera for generating image data including a first surrounding image representing the surroundings of the vehicle. The wide-angle camera 2 includes a two-dimensional detector constructed from an array of optoelectronic transducers, such as CCD or C-MOS, having sensitivity to visible light and a focusing optical system that forms an image of a region to be captured on the two-dimensional detector. The wide-angle camera 2 can capture a first imaging range, for example, a range of ±30 degrees in the horizontal direction from the optical axis of the focusing optical system. The wide-angle camera 2 is disposed, for example, in a front and upper area in the interior of the vehicle and oriented forward. The wide-angle camera 2, for example, has a clock synchronized with the clock supplied by the GNSS receiver 4. The wide-angle camera 2 takes a picture of the surroundings of the vehicle 1 through a windshield every predetermined capturing period (e.g., $1/30$ to $1/10$ seconds), and outputs image data representing the surroundings. The image data outputted by the wide-angle camera 2 can be used for acquiring detailed information of an object at a position of a relatively small distance from the vehicle 1.

The telescopic camera 3 is an example of a second camera for generating image data including a second surrounding image representing the surroundings of the vehicle. The telescopic camera 3 includes a two-dimensional detector constructed from an array of optoelectronic transducers, such as CCD or C-MOS, having sensitivity to visible light and a focusing optical system that forms an image of a region to be captured on the two-dimensional detector. The telescopic camera 3 can capture a second imaging range narrower than the first imaging range, for example, a range of ±15 degrees in the horizontal direction from the optical axis of the focusing optical system. The telescopic camera 3 is disposed, for example, in a front and upper area in the interior of the vehicle and oriented forward so as to be aligned with the wide-angle camera 2 left and right. The telescopic camera 3, for example, has a clock synchronized with the clock supplied by the GNSS receiver 4. The telescopic camera 3 takes a picture of the surroundings of the vehicle 1 through a windshield every predetermined capturing period (e.g., $1/30$ to $1/10$ seconds) and outputs image data representing the surroundings. The image data outputted by the telescopic camera 3 can be used for acquiring information of an object at a position of a relatively large distance from the vehicle 1.

The wide-angle camera 2 and telescopic camera 3 may also be oriented backward or to the sides of the vehicle 1, instead of, or in addition to, forward of the vehicle 1 and aligned at the left and right so as to capture the same object.

The GNSS receiver 4, which is an example of a positioning sensor, receives GNSS signals from GNSS satellites at predetermined intervals, and determines the position of the vehicle 1 based on the received GNSS signals. The GNSS receiver 4 outputs a positioning signal indicating the result of determination of the position of the vehicle 1 based on the GNSS signals to the apparatus 5 via the in-vehicle network at predetermined intervals.

The apparatus 5 for distance estimation is an electronic control unit (ECU) including a communication interface, a memory, and a processor. The apparatus 5 receives images from the wide-angle camera 2 and the telescopic camera 3 via the communication interface. The apparatus estimates the distance between the vehicle 1 and an object present in the surroundings of the vehicle 1 by using the received images to.

Figure 2:
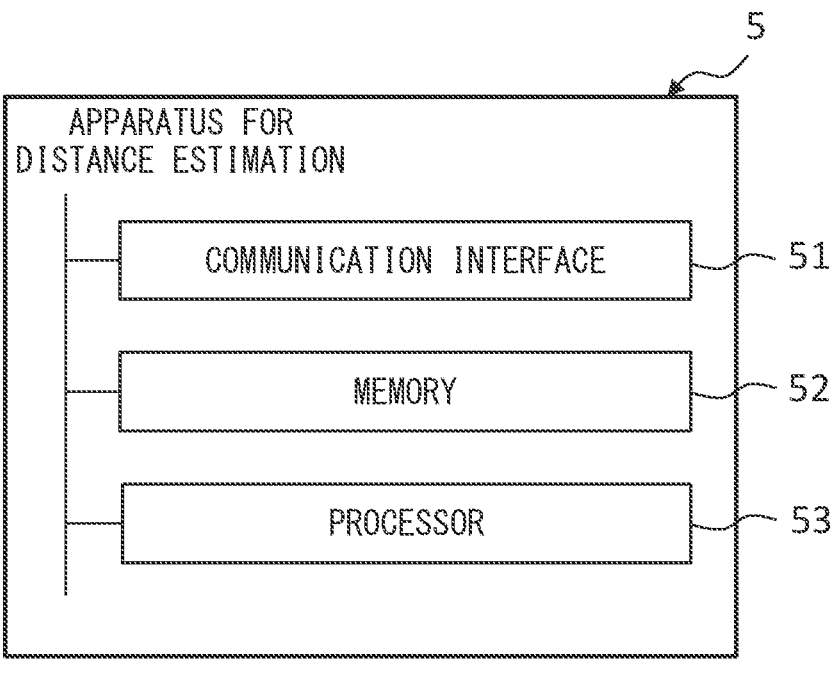
FIG. 2 schematically illustrates hardware of the apparatus for distance estimation.

FIG. 2 schematically illustrates the hardware of the apparatus 5. The apparatus 5 includes a communication interface 51, a memory 52, and a processor 53.

The communication interface 51, which is an example of a communication unit, includes a communication interface circuit for connecting the apparatus 5 to the in-vehicle network. The communication interface 51 provides received data to the processor 53, and outputs data provided from the processor 53 to an external device.

The memory 52, which is an example of a storage unit, includes volatile and nonvolatile semiconductor memories. The memory 52 contains various types of data used for processing by the processor 53, e.g., respective internal parameters of the wide-angle camera 2 and telescopic camera 3, such as mounting positions, mounting directions, focal distances of focusing optical systems, and, the pixel sizes of the surrounding images, parameters of a neural network used as a classifier for detecting feature points of objects from the images (number of layers, layer configurations, kernels, weighting coefficients, etc.), etc. The memory 52 also contains various application programs, such as a program for distance estimation program to execute therefor.

The processor 53, which is an example of a control unit, includes one or more processors and a peripheral circuit thereof. The processor 53 may further include another operating circuit, such as a logic-arithmetic unit, an arithmetic unit, or a graphics processing unit.

Figure 3:
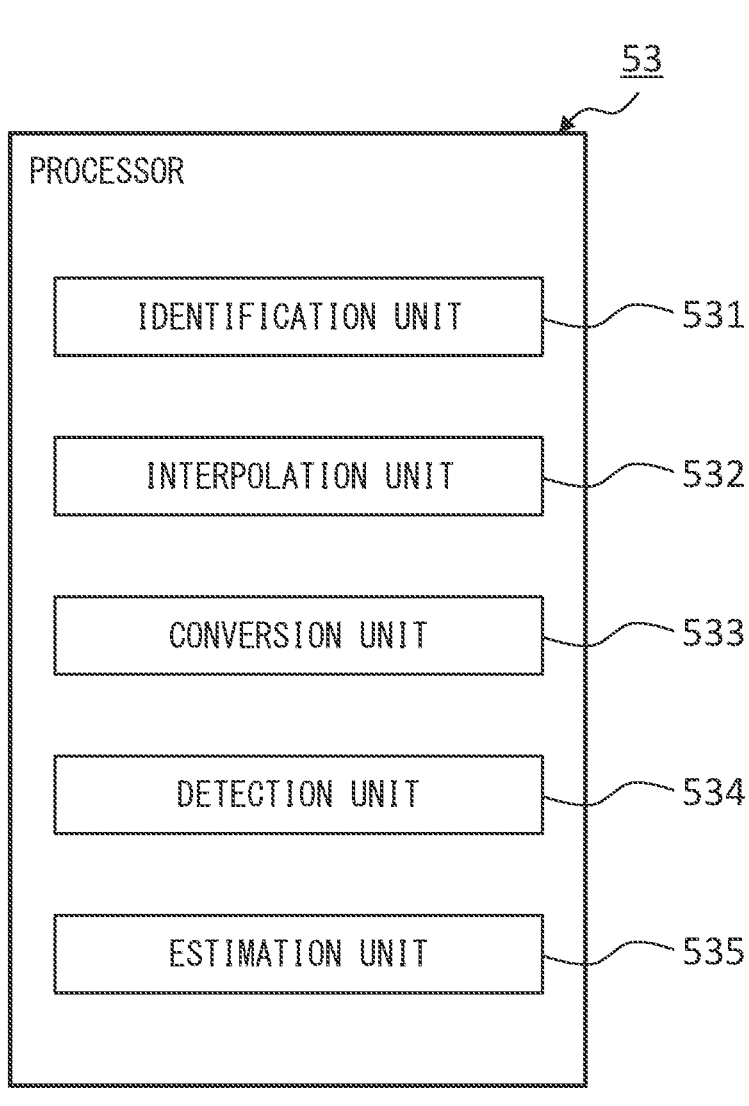
FIG. 3 is a functional block diagram of a processor included in the apparatus.

FIG. 3 is a functional block diagram of the processor 53 included in the apparatus 5.

As its functional blocks, the processor 53 of the apparatus 5 includes an identification unit 531, an interpolation unit 532, a conversion unit 533, a detection unit 534, and an estimation unit 535. These units included in the processor 53 are functional modules implemented by a computer program executed on the processor 53. The computer program for achieving the functions of the units of the processor 53 may be provided in a form recorded on a computer-readable and portable medium, such as a semiconductor memory, a magnetic recording medium, or an optical recording medium. Alternatively, the units included in the processor 53 may be implemented in the distance estimating device 5 as separate integrated circuits, microprocessors, or firmware.

The identification unit 531 identifies a first partial region from a first surrounding image representing the surroundings of the vehicle 1 generated by the wide-angle camera 2 at a first point of time. The first partial region is corresponding to a region represented in a preceding second surrounding image generated at a second point of time before the first point of time by the telescopic camera 3 or a region represented in a succeeding second surrounding image generated at a third point of time after the first point of time by the telescopic camera 3.

Figure 4:
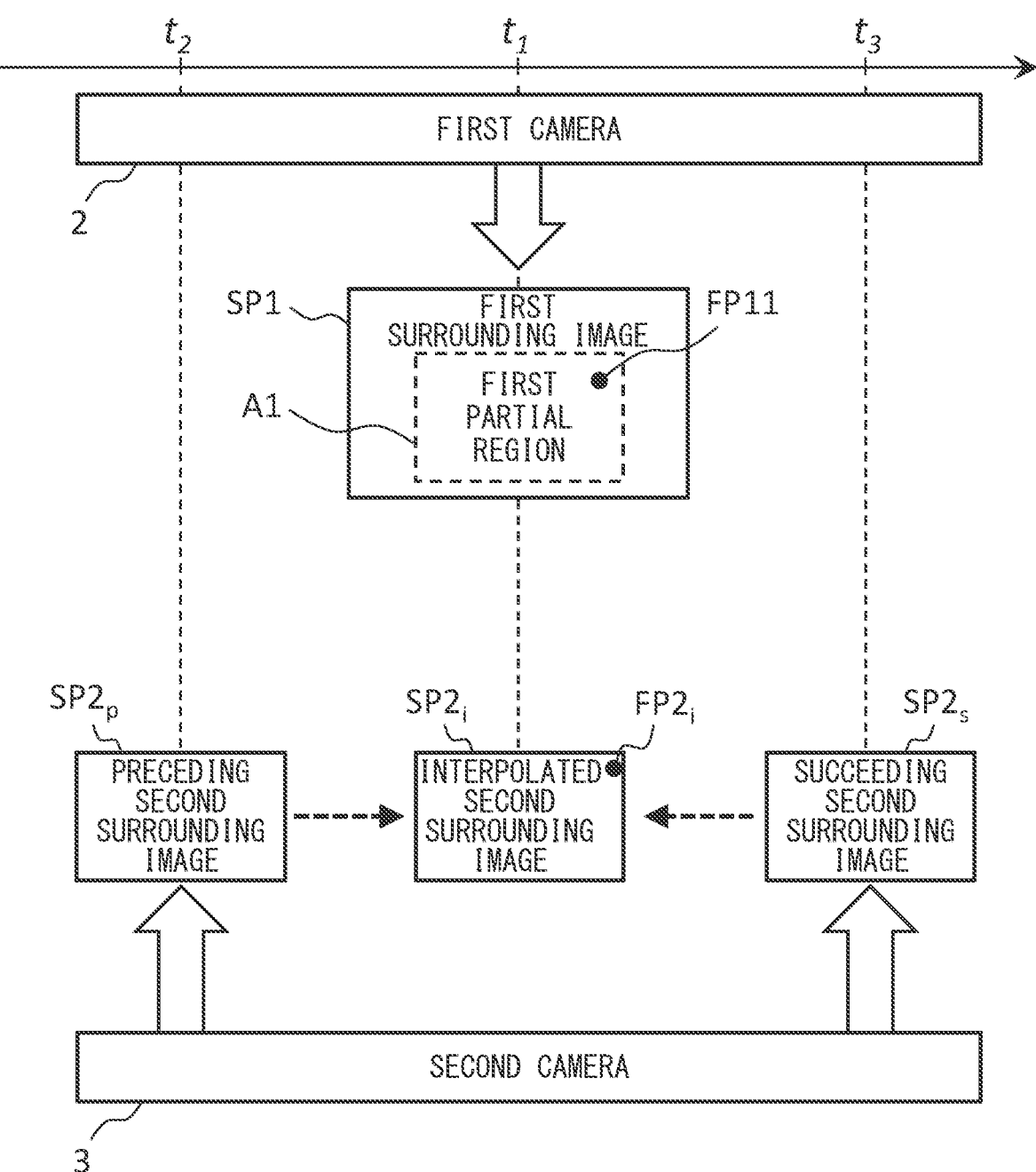
FIG. 4 illustrates an example of processing of a surrounding image.

FIG. 4 illustrates an example of processing of a surrounding image.

The wide-angle camera 2 generates a first surrounding image SP1 at the first point of time $t_1$. The telescopic camera 3 generates a preceding second surrounding image $SP2_p$ at a second point of time $t_2$ before the first point of time $t_1$ and generates a succeeding second surrounding image $SP2_s$ at a third point of time $t_3$ after the first point of time $t_1$.

The identification unit 531 refers to the respective mounting positions, mounting directions, and internal parameters of the wide-angle camera 2 and telescopic camera 3 stored in the memory 52. The identification unit 531 also calculates the travel distance of the vehicle 1 between the second point of time $t_2$ and the first point of time $t_1$ or the travel distance of the vehicle 1 between the first point of time $t_1$ and the third point of time $t_3$.

The identification unit 531 calculates the travel distance of the vehicle 1 between the second point of time $t_2$ and the first point of time $t_1$ or the travel distance of the vehicle 1 between the first point of time $t_1$ and the third point of time $t_3$ from the respective positions of the vehicle 1 at the first point of time $t_1$, the second point of time $t_2$, and the third point of time $t_3$. The identification unit 531 identifies the respective positions of the vehicle 1 at the second point of time $t_2$ and the third point of time $t_3$ based on the respective positioning signals corresponding to the second point of time $t_2$ and the third point of time $t_3$ (GNSS positioning). Note that, the identification unit 531 may identify the position of the vehicle 1 (position of the wide-angle camera 2 or telescopic camera 3) by acquiring information relating to terrestrial objects in the surroundings of positions corresponding to the positioning signals acquired from the GNSS receiver 4 from a storage device mounted on the vehicle 1 and storing high precision map information (not shown) and comparing it with respective terrestrial objects represented in the first surrounding image SP1, preceding second surrounding image $SP2_p$, or succeeding second surrounding image $SP2_s$ (localization).

Alternatively the identification unit 531 may calculate the travel distance of the vehicle 1 between the second point of time $t_2$ and the first point of time $t_1$ or the travel distance of the vehicle 1 between the first point of time $t_1$ and the third point of time $t_3$ without using the respective positions of the vehicle 1 at the respective first point of time $t_1$, second point of time $t_2$, and third point of time $t_3$. For example, the identification unit 531 may calculate the travel distance of the vehicle 1 by using data indicating the movement of the vehicle 1 obtained from a sensor mounted on the vehicle 1 such as an acceleration sensor or an angular speed sensor at a plurality of points of time during movement (odometry information).

The identification unit 531 identifies a first partial region A1 from the first surrounding image SP1 by identifying a region which a range represented in a preceding second surrounding image $SP2_p$ acquired at a second point of time $t_2$ by the telescopic camera 3 occupies in the field of the wide-angle camera 2 at the first point of time $t_1$, based on the parameters of the cameras and the travel distance of the vehicle 1. The identification unit 531 also identifies the first partial region A1 from the first surrounding image SP1 by identifying a region which a range represented in a succeeding second surrounding image $SP2_s$ acquired at the third point of time $t_3$ by the telescopic camera 3 occupies in the field of the wide-angle camera 2 at the first point of time $t_1$, based on the parameters of the cameras and the amount of movement of the vehicle 1.

Returning to FIG. 3, the interpolation unit 532 generates an interpolated second surrounding image $SP2_i$ corresponding to the first point of time $t_1$ by using the preceding second surrounding image $SP2_p$ and the succeeding second surrounding image $SP2_s$. The interpolation unit 532 generates an interpolated position of the telescopic camera 3 corresponding to the first point of time $t_1$ by using the respective positions of the telescopic camera 3 at the second point of time $t_2$ and the third point of time $t_3$.

The interpolation unit 532 detects motion vectors of respective blocks in a predetermined size (for example, 16 pixels×16 pixels) obtained by dividing the preceding second surrounding image $SP2_p$ and succeeding second surrounding image SP2$_s$, for example, by block matching. The interpolation unit 532 generates an interpolated second surrounding image SP2$_i$ by arranging respective blocks in the preceding second surrounding image SP2$_p$ or succeeding second surrounding image SP2$_s$ at positions obtained by apportioning motion vectors in accordance with the time interval between the second point of time t$_2$ and the first point of time t$_1$ and the time interval between the first point of time t$_1$ and the third point of time t$_3$.

The interpolation unit 532 acquires the respective positions of the vehicle 1 at the respective second point of time t$_2$ and third point of time t$_3$ from the identification unit 531. The interpolation unit 532 estimates the position of the vehicle 1 corresponding to the first point of time t$_1$ by apportioning the respective positions of the vehicle 1 at the second point of time t$_2$ and third point of time t$_3$ in accordance with the time interval between the second point of time t$_2$ and the first point of time t$_1$ and the time interval between the first point of time t$_1$ and the third point of time t$_3$. The interpolation unit 532 also estimates the interpolated position of the telescopic camera 3 corresponding to the first point of time t$_1$ by using the relationship between a predetermined position of the vehicle 1 included in the acquired positions of the vehicle 1 and the mounting position of the telescopic camera 3 stored in the memory 52. The predetermined position of the vehicle 1 may be, in case that the position of the vehicle 1 is identified by GNSS positioning, the position of the GNSS antenna. Alternatively, the predetermined position of the vehicle 1 may be, in case that the position of the vehicle 1 is identified by localization, the position of the wide-angle camera 2. In each case as well, the predetermined position of the vehicle 1 included in the acquired position of the vehicle 1 may be corrected so as to represent a specific position of the vehicle 1 (for example, the position of the driver's seat). Further, if the position of the telescopic camera 3 is acquired as the position of the vehicle 1 by localization, it is not necessary to estimate the interpolated position of the telescopic camera 3 using the relationship between the acquired predetermined position of the vehicle 1 and the mounting position of the telescopic camera 3. Note that, if the identification unit 531 identifies the travel distance of the vehicle 1 without relying on the position of the vehicle 1, the interpolation unit 532 may identify the position of the vehicle 1 by a process using the positioning signal acquired from the GNSS receiver 4 described as operation of the identification unit 531 or a process using terrestrial objects included in high precision map information.

The interpolation unit 532 may also estimate, as the interpolated position of the telescopic camera 3 corresponding to the first point of time t$_1$, the relative position of the telescopic camera 3 relative to the position of the wide-angle camera 2 at the first point of time t$_1$ based on the respective mounting positions of the wide-angle camera 2 and telescopic camera 3 stored in the memory 52. In this case, the interpolation unit 532 acquires the position of the wide-angle camera 2 as the position of the vehicle 1 by localization.

The conversion unit 533 converts the resolution of at least one of the first partial region A1 and interpolated second surrounding image SP2$_i$ in accordance with a predetermined up-sampling technique or down-sampling technique so that the first partial region A1 and the interpolated second surrounding image SP2$_i$ have the same resolutions.

If the first partial region A1 and the interpolated second surrounding image SP2$_i$ have the same resolution without conversion, the conversion by the conversion unit 533 is not required. Therefore, in a vehicle 1 where the first partial region A1 and the interpolated second surrounding image SP2$_i$ (that is, the preceding second surrounding image SP2$_p$ and succeeding second surrounding image SP2$_s$) have the same resolution, the apparatus 5 need not have a conversion unit 533.

The detection unit 534 detects one or more feature points for a target object represented in both the first partial region A1 and the interpolated second surrounding image SP2$_i$.

The detection unit 534 detects one or more feature points (for example, grounding points of tires) of target objects existing in the surroundings of the vehicle 1 (for example, other vehicles), by, for example, inputting the first partial region A1 and interpolated second surrounding image SP2$_i$ into the classifier trained in advance so as to detect feature points from the image.

The classifier may be, for example, a convolutional neural network (CNN) including a plurality of convolution layers connected in series from the input toward the output. By using the plurality of images showing a predetermined object to be detected and tagged with feature points as teacher data and inputting it into the CNN to train it in advance, the CNN operates as a classifier detecting feature points of an object.

The detection unit 534 may extract feature points from the respective first partial region A1 and interpolated second surrounding image SP2$_i$ in accordance with feature point extraction techniques such as a Harris corner detector and Scale-Invariant Feature Transform (SIFT).

With respect to the example shown in FIG. 4, the detection unit 534 detects feature points including the feature point FP1 from the first partial region A1 and detects feature points including the feature point FP2$_i$ corresponding to the feature point FP1 from the interpolated second surrounding image SP2$_i$.

The estimation unit 535 estimates the distance between the vehicle 1 and the target object by using at least a relationship between the position of the wide-angle camera 2 at the first point of time and the interpolated position of the telescopic camera 3 and a relationship between the position of one feature point among the one or more feature points in the first partial region A1 and the position of the feature point corresponding to the one feature point in the interpolated second surrounding image SP2$_i$.

The estimation unit 535 calculates the distance between the wide-angle camera 2 and the telescopic camera 3, for example, from the relationship between the position of the wild-angle camera 2 at the first point of time and the interpolated position of the telescopic camera 3. The estimation unit 535 also calculate the parallax by multiplying the pixel size with the interval (number of pixels) on the image between the feature point FP1 and the feature point FP2$_i$ when superposing the first partial region A1 and interpolated second surrounding image SP2$_i$. Further, the estimation unit 535 estimates the distance between the telescopic camera 3 and the feature point FP1 (or feature point FP2$_i$), which can be calculated by dividing the product of the distance between the wide-angle camera 2 and telescopic camera 3 and the focal length of the optical system of the telescopic camera 3 by the parallax, as the distance between the vehicle 1 and target object.

FIG. 5 is a flowchart of a process for estimating distance. The apparatus 5 repeatedly performs the process at predetermined time intervals (for example, ¹⁄₁₀ second intervals) while the vehicle 1 is traveling.

First, the identification unit 531 of the apparatus 5 identifies a first partial region A1 from the first surrounding image SP1 generated by the wide-angle camera 2 at the first point of time $t_1$ (step S1).

Next, the interpolation unit 532 of the apparatus 5 generates an interpolated second surrounding image SP2$_i$ corresponding to the first point of time $t_1$ by using a preceding second surrounding image SP2$_p$ generated by the telescopic camera 3 at the second point of time $t_2$ and a succeeding second surrounding image SP2$_s$ generated at the third point of time $t_3$. Further, the interpolation unit 532 generates an interpolated position of the telescopic camera 3 corresponding to the first point of time $t_1$ by using the respective positions of the telescopic camera 3 at the second point of time $t_2$ and the third point of time $t_3$ (step S2).

Next, the conversion unit 533 of the apparatus 5 converts the resolution of at least one of the first partial region A1 and interpolated second surrounding image SP2$_i$ to make the first partial region A1 and interpolated second surrounding image SP2$_i$ have the same resolutions (step S3).

Next, the detection unit 534 of the apparatus 5 detects one or more feature points for the target object represented in both the first partial region A1 and the interpolated second surrounding image SP2$_i$ (step S4).

The estimation unit 535 of the apparatus 5 estimates the distance between the vehicle 1 and the target object by using at least a relationship between the position of the wide-angle camera 2 at the first point of time and the interpolated position of the telescopic camera 3 and a relationship of the position of one feature point among the one or more feature points in the first partial region A1 and the position of the feature point corresponding to the one feature point in the interpolated second surrounding image SP2$_i$ (step S5) and terminates the process.

Such a process for distance estimation enables the apparatus 5 to estimate a distance to a target object in the surroundings of a vehicle in a suitable precision without relying on dedicated stereo cameras.

The apparatus 5 sends the estimated distance between the vehicle 1 and the target object to a travel controller sending control signals to traveling mechanisms of the vehicle 1 such as the engine or motor, brakes, and steering. The travel controller can use the estimated distance between the vehicle 1 and the target object to control the travel of the vehicle 1 so that the distance between the vehicle 1 and an object in the surroundings of the vehicle 1 keeps a predetermined value or more.

According to a modified example, the detection unit 534 detects feature points from the preceding second surrounding image SP2$_p$ and the succeeding second surrounding image SP2$s$ respectively, in place of or in addition to detection of feature points from the interpolated second surrounding image SP2$_i$. Further, from the respective positions of the features points detected from the preceding second surrounding image SP2$_p$ and the succeeding second surrounding image SP2$_s$, the estimation unit 535 estimates the positions of the feature points which would be represented in an image under the assumption that the image was generated at the first point of time $t_1$ by the telescopic camera 3 (corresponding to interpolated second surrounding image SP2). The estimation unit 535 estimates the distance between the vehicle 1 and the target object by using the estimated positions of the feature points. In this case, the interpolation unit 532 need not generate the interpolated second surrounding image SP2$_i$.

A person skilled in the art should understand that various changes, substitutions, and corrections can be made to this without departing from the spirit and scope of the present disclosure.

What is claimed is:

1. An apparatus for distance estimation, comprising a processor configured to identify, from a first surrounding image representing surroundings of a vehicle generated at a first point of time by a first camera mounted in the vehicle and having a first imaging range, a first partial region corresponding to a region represented in a preceding second surrounding image generated at a second point of time before the first point of time by a second camera mounted in the vehicle and having a second imaging range narrower than the first imaging range or a region represented in a succeeding second surrounding image generated at a third point of time after the first point of time by the second camera, generate an interpolated second surrounding image corresponding to the first point of time by using the preceding second surrounding image and the succeeding second surrounding image, the interpolated second surrounding image being generated based on the images captured at the second point of time and the third point of time, estimate an interpolated position of the second camera corresponding to the first point of time by using the respective positions of the second camera at the second point of time and the third point of time or the position of the first camera at the first point of time, detect one or more feature points for a target object represented in both the first partial region and the interpolated second surrounding image, and estimate the distance between the vehicle and the target object by using at least a relationship between the position of the first camera at the first point of time and the interpolated position of the second camera, and, a relationship between the position of one feature point among the one or more feature points in the first partial region and the position of the feature point corresponding to the one feature point in the interpolated second surrounding image.

2. The apparatus according to claim 1, wherein the processor is further configured to convert the first partial region and the interpolated second surrounding image so as to have the same resolutions by changing resolution of at least one of the first partial region and interpolated second surrounding image.

3. A method for distance estimation, comprising:

identifying from a first surrounding image representing surroundings of a vehicle generated at a first point of time by a first camera mounted in the vehicle and having a first imaging range, a first partial region corresponding to a region represented in a preceding second surrounding image generated at a second point of time before the first point of time by a second camera mounted in the vehicle and having a second imaging range narrower than the first imaging range or a region represented in a succeeding second surrounding image generated at a third point of time after the first point of time by the second camera, generating an interpolated second surrounding image corresponding to the first point of time by using the preceding second surrounding image and the succeeding second surrounding image, the interpolated second surrounding image being generated based on the images captured at the second point of time and the third point of time, estimating an interpolated position of the second camera corresponding to the first point of time by using the respective positions of the second camera at the second point of time and the third point of time or the position of the first camera at the first point of time, detecting one or more feature points for a target object represented in both the first partial region and the interpolated second surrounding image, and estimating the distance between the vehicle and the target object by using at least a relationship between the position of the first camera at the first point of time and the interpolated position of the second camera and a relationship between the position of one feature point among the one or more feature points in the first partial region and the position of the feature point corresponding to the one feature point in the interpolated second surrounding image.

4. A non-transitory computer-readable medium having a computer program for distance estimation stored therein, the computer program causing a computer to execute a process comprising:

identifying from a first surrounding image representing surroundings of a vehicle generated at a first point of time by a first camera mounted in the vehicle and having a first imaging range, a first partial region corresponding to a region represented in a preceding second surrounding image generated at a second point of time before the first point of time by a second camera mounted in the vehicle and having a second imaging range narrower than the first imaging range or a region represented in a succeeding second surrounding image generated at a third point of time after the first point of time by the second camera, generating an interpolated second surrounding image corresponding to the first point of time by using the preceding second surrounding image and the succeeding second surrounding image, the interpolated second surrounding image being generated based on the images captured at the second point of time and the third point of time, estimating an interpolated position of the second camera corresponding to the first point of time by using the respective positions of the second camera at the second point of time and third point of time or the position of the first camera at the first point of time, detecting one or more feature points for a target object represented in both the first partial region and the interpolated second surrounding image, and estimating the distance between the vehicle and the target object by using at least a relationship between the position of the first camera at the first point of time and the interpolated position of the second camera and a relationship between the position of one feature point among the one or more feature points in the first partial region and the position of the feature point corresponding to the one feature point in the interpolated second surrounding image.

* * * * *